United States Patent [19]

Hatchard

[11] Patent Number: 4,510,202

[45] Date of Patent: Apr. 9, 1985

[54] ADHESION ACTIVATED ARAMID FIBER

[75] Inventor: William R. Hatchard, Hockessin, Del.

[73] Assignee: E. I. Du Pont De Nemours and Company, Wilmington, Del.

[21] Appl. No.: 563,226

[22] Filed: Dec. 19, 1983

[51] Int. Cl.[3] ............................................. B32B 27/34
[52] U.S. Cl. .................................... 428/295; 428/375; 428/395; 428/413; 428/492; 428/902
[58] Field of Search ............... 428/295, 375, 395, 413, 428/902, 492

[56] References Cited

U.S. PATENT DOCUMENTS

| | | | |
|---|---|---|---|
| 2,902,398 | 9/1959 | Schroeder | 156/315 |
| 3,190,764 | 6/1965 | Cardina | 427/333 |
| 3,308,007 | 3/1967 | Shepard | 428/395 |
| 3,525,703 | 8/1970 | Iwami et al. | 523/408 |
| 3,715,266 | 2/1973 | Winters et al. | 428/292 |
| 3,775,150 | 11/1973 | McClary | 525/109 |
| 3,888,805 | 6/1975 | Gils et al. | 428/295 |
| 4,228,207 | 10/1980 | Porte et al. | 428/902 |
| 4,309,473 | 1/1982 | Minamisawa et al. | 428/902 |

OTHER PUBLICATIONS

Research Disclosure 13347, (May 1975).
Research Disclosure 13730, (Sep. 1975)
Koppers Resins Technical Bulletin, Penacolite ® Resins R-2170 and R-2200, (Oct. 1979), pp. 1 and 2.

Primary Examiner—James J. Bell

[57] ABSTRACT

Adhesion activation of aramid filaments is accomplished by subcoating with a reaction product of an epoxide resin and an aldehyde resin.

5 Claims, No Drawings

ADHESION ACTIVATED ARAMID FIBER

BACKGROUND OF THE INVENTION

In preparation for reinforcing rubber with textile cords, it is customary to topcoat the cords first with RFL (resorcinol-formaldehyde-latex) compositions in order to improve adhesion of the cords to the rubber. The applied RFL topcoat is only partially cured before embedment in rubber. This approach is very effective for nylon cords. For cords of many other polymers, e.g., polyethylene terephthalate, it is desirable to subcoat the yarns first with a material that enhances adhesion of the RFL topcoat to the cords. This is often referred to as adhesion activation.

High modulus, high tenacity aramid yarns as described, for example, in Blades U.S. Pat. No. 3,869,429, issued Mar. 4, 1975, and Shimada et al. U.S. Pat. No. 4,355,151, issued Feb. 26, 1979, are outstandingly effective for rubber reinforcement. It has been found that cords of such yarns do not exhibit adequate adhesion to rubber when coated only with RFL. Adhesion activation is required such as described in *Research Disclosures* 13730 (September 1975) and 13347 (May 1975). Generally these involve a subcoat of partially cured epoxy resin followed by an RFL topcoat.

This invention provides a system which enables the yarn producer to adhesion activate his aramid yarns. The rubber goods manufacturer needs apply only a single RFL dip to the reinforcing cords before embedment in rubber, as in tire applications.

SUMMARY OF THE INVENTION

This invention provides adhesion activated aramid filaments, particularly poly(p-phenylene terephthalamide) (PPD-T) filaments, coated with a reaction product of an epoxide resin and an incompletely cured, thermosetting, aldehyde resin. Also provided is a rubber composite reinforced with such filaments.

DETAILED DESCRIPTION OF THE INVENTION

Yarns useful in this invention are composed of any aramid, preferably a high modulus aramid yarn with a tensile modulus [10 inch (25.4 cm) gage length, 1.1 twist multiplier, room temperature, 50% elongation per minute] above 300 g/denier (265 dN/tex), more preferably above 500 g/denier (707 dN/tex). Poly(p-phenylene terephthalamide) (PPD-T) yarn is preferred for use in this invention. The starting yarn should have little or no twist, i.e., less than 1 turn/inch (0.4 turn/cm) and preferably none.

In the preparation of the products of the invention, a solution of an epoxide resin and a solution of an aldehyde resin (hereinafter "precondensate") are mixed and applied to the filaments of the yarn. Preferably these resins are water soluble, but either or both may be emulsified in water or used in solution in other solvents, e.g., ethyl alcohol or acetone.

Precondensates are available commercially, usually in strongly acidic form. To maintain their solubility on dilution in water it is necessary to add sufficient base to create an alkaline solution. The most convenient bases are NaOH, NH$_4$OH, and their mixtures.

In practicing adhesion activation as intended in this invention, generally an epoxy resin stock solution and a precondensate stock solution are prepared separately and then mixed before application to yarns or cords. Solids content of the final solution and the means of application are selected to deposit 1.0 to 5.0%, preferably about 2.0 to 3.0%, by weight subcoat solids on the yarns, based on the weight of uncoated dry yarn. Dipping of yarns into the solution is an effective means of application. Because reaction occurs in the solution, solution lifetime is limited. In commercial use, metered application of the solution to the yarn is preferred, and most preferably the two stock solutions are separately metered to a mixing zone just prior to application to the yarn.

Mixtures of epoxide resin and formaldehyde precondensate on the fiber polymerize together readily at elevated temperature, and it has been found that very little, if any, unreacted epoxide resin remains. This is a desirable feature because unreacted epoxide resins frequently cause dermatitis, and some are suspected carcinogens. The presence of unreacted starting epoxide resins is readily detected by extracting subcoated yarns with methylene chloride in a Soxhlet extractor and then titrating the extract by HBr addition, as is well known. The ratio of epoxide resin to aldehyde precondensate (E/P) and the curing conditions (time and temperature, or presence of a catalyst) can be adjusted to give a combination of a low level of unreacted starting epoxide and a high level of reactivity to a subsequent RFL topcoat, as indicated by high adhesion levels. Generally, E/P ratios from 1 to about 6 by weight have been found useful. Lower E/P ratios are more effective when NaOH is present. Drying/curing is effective at 150° to 200° C. for 2 to 4 seconds. These times are considerably shorter than is employed for adequately curing an epoxide resin coating and permit ready incorporation of the coating and curing steps within the aramid fiber production operation.

The adhesion activated yarns of this invention have a long shelf life; that is, the subcoated yarns may be stored for long periods before being RFL-coated without any loss of adhesion effectiveness. For instance, yarns subcoated substantially identically to Examples 1E, F, G, and H were tested promptly for 2-ply strap adhesion and then allowed to stand over periods from 2 to 7 months before being topcoated and retested. No change in 2-ply strap adhesion was detected. All had peel strengths in the range of 41 to 53 lbs. (182 to 236N).

Epoxide resins for use in this invention should be uncured and have an average of more than one epoxy group per molecule. Average molecular weight is preferably in the range from about 200 to about 2500, and the epoxide equivalent weight is preferably in the range from about 100 to about 500. The term "epoxide equivalent weight" means the weight in grams of resin which contains 1 gram equivalent of epoxy groups. Such epoxide resins include those commonly prepared by the reaction of haloepoxides with polyhydric alcohols, polyhydric phenols, and polybasic heterocyclic acids.

For example, reaction of epichlorohydrin with glycerol yields mixtures of mono-, di-, and tri-glycidyl ethers of glycerol whose compositions may vary according to conditions of preparation. A preferred mixed glycidyl ether of glycerol is designated NER-010A (Nagase Chemical Co., Japan), has an epoxide equivalent weight of 143, is 98% soluble in water, and contains 9 weight percent chlorine. Denacol EX512 and EX521 (Nagase Chemical Co.) are two useful resins of slightly higher molecular weight made from the same ingredients.

Glycidyl ethers of substituted hydantoins (e.g. XU 238 by Ciba Geigy) and of isocyanuric acid (e.g., triglycidylisocyanurate) are particularly useful because they are water soluble and compatible with aqueous formaldehyde prepolymer solutions. Water-insoluble glycidyl ether resins such as those derived from bisphenol-A (e.g., Epon 826 and 828 by Shell Chemical Co.) or from a cresol novolak (e.g., ECN 1299 epoxy cresol novolak by Ciba Geigy) can be used as solutions in organic solvents or as aqueous dispersions for application to yarns.

The thermosetting resins useful in mixtures with epoxide resins according to this invention include any fusible, soluble condensates of an aldehyde with a phenol, and an amine such as urea, and/or melamine.

These fusible and soluble condensates are usually referred to as precondensates. The aldehydes used in preparing such precondensates may be aliphatic, cycloaliphatic, or aromatic monoaldehydes, e.g., acetaldehyde, cyclohexanal, benzaldehyde, and the like. Formaldehyde and materials which engender formaldehyde (e.g., paraformaldehyde) are the preferred materials for use.

Phenols for condensation with aldehydes may include any mono- or poly-nuclear and mono- or polyhydric phenols. Particularly preferred are phenol and resorcinol. The preparation of fusible precondensates of these types is fully described in the prior art. They may be formed in aqueous solution and then mixed directly with an epoxide resin for application to yarn or fabirc. Particularly convenient for use are commercially available precondensates such as Penacolite TM , Arofene TM , and Cymel TM resins. The Penacolite resins are condensates of resorcinol and formaldehyde available from the Koppers Co. The Arofene resin is a formaldehyde/phenol resin from Ashland Chemical Co. The Cymel resin precursor is hexamethoxymethylmelamine made from formaldehyde and melamine and available from American Cyanamid Co.

While it is preferred to use commercially available preformed condensates in preparing solutions for application to yarns, it is, of course, equally effective to use precondensates formed in situ. For example, in place of Penacolite resins, one can mix formalin (37% by weight formalehyde in water) and resorcinol in water and add ammonia to create an aqueous precondensate.

Moreover, one is not constrained to the resorcinol/formaldehyde (R/F) ratio available in commercial precondensates since addition of, e.g., formalin to the epoxide/precondensate solution readily varies the ratio as the mixture is allowed to equilibrate. This adjustment of the R/F ratio is as described in The Technical Bulletin of the Koppers Co. dated October, 1979 and entitled "Penacolite Resins R-2170 and R-2200". It is used in Examples 1I and 1J.

TESTING PROCEDURES

All aramid cords used in the hot 2-ply strap adhesion test were 1500/1/2, i.e., 1500 denier (1667 dtex) yarn, one yarn per strand, and two strands per cord. Except where otherwise stated in the Examples they were twisted to a twist multiplier (TM) of 6.5 where:

$$TM = (Denier)^{\frac{1}{2}} (tpi)/73$$
$$= (dtex)^{\frac{1}{2}} (tpc)/30.3$$

and tpi is "twists per inch", and tpc is "twists per cm". In short, each yarn was twisted about 3.5 turns per cm in one direction (S or Z), and then two twisted yarns were twisted together about 3.5 turns per cm in the reverse direction (Z or S).

The hot 2-ply strap adhesion test is used to evaluate only the adhesive bond (peel strength) between unflexed rubber and reinforcing cord layers embedded in it. The test specimens are themselves reinforced rubber goods. The test employed is as described in ASTM D2630-71, but several details either not given or slightly modified are specified in the following three paragraphs.

A total of 12 test specimens (including at least 2 controls) are cut from a single plied assembly. Each test specimen is 1 inch (2.5 cm) wide and 4.5 inch (11.4 cm) long and has, at the center of its thickness, an inserted polyethylene sheet extending 1 inch (2.54 cm) from only one end for subsequent opening of the ends for testing. Each test specimen is an eight-layer sandwich consisting of two layers of rubber stock, a layer of spaced and parallel cords, two central layers of rubber stock, a second layer of spaced and parallel cords, and two layers of rubber stock. The rubber stock used is representative of those used commercially. It is a sheet of high modulus, all-natural rubber stock 0.015 in. (0.38 mm) thick and 12 in. (305 mm) wide. The 1500/1/2 aramid cords are wound at 36 ends/in. (14.2 ends/cm). Winding tension is 225±25 grams. Final molding is in a mold preheated to 160±2° C. under 7 tons (62.3 kN) pressure for 20 minutes.

Testing for hot 2-ply strap adhesion involves heating each specimen to 120° C., opening an end to remove the piece of polyester film, inserting one separated end into each of the clamps of a laboratory stress/strain tester to at least 1 in. (2.5 cm) so that the specimen is centered, and separating the clamps at a crosshead speed of 5 in. (12.7 cm) per minute. Full-scale load should be adjusted to 100 lbs. (45.45 kg), and a chart speed of 2 in. (5.08 cm) per minute is preferred. The chart will record a series of peaks. The very first one is ignored and if peak height decreases near the end of the test, only those of the first in. (2.5 cm) of the chart are considered. A line is drawn through the peaks and the fraction of full-scale it is above the zero line is determined. Multiplying this fraction by the full-scale load yields "peel strength" in whatever units the load is in.

Failure of each specimen in testing can be totally within a rubber layer, or at the cord/rubber interface, or a combination of the two. Each break is also rated for "appearance" on a scale of 1 to 5 where 1 means cords are completely uncovered and 5 means no cord at all is visible. Standard rating boards are available for this subjective evaluation.

In the examples below, the oven used for curing the RFL dips applied to cords is a single-end, commercial unit provided with an enclosed, elongated yarn path and heated with partially recirculated hot air. There is provision for automatically maintaining any selected tension on cord passing through the oven. This commercial unit is referred to herein as the Litzler unit (or just "the Litzler"). The starting yarns were of poly(p-phenylene terephthalamide), 1500 denier (1667 dtex)/1000 filaments (untwisted) which had only been partially dried after wet spinning and washing to leave a water content of about 100% by weight based on dry yarn.

When considering the examples that follow, it should be understood that the results reported are believed to be representative and do not constitute all the runs involving the indicated components of the present invention. The testing method sometimes yields variable results.

EXAMPLE 1

This example illustrates adhesion activation provided by a subcoat comprising a mixture of di- and tri-glycidyl ethers of glycerol (Nagase & Co. epoxide resin NER-010A) and resorcinol/formaldehyde precondensate (Koppers Penacolite resin R-2170, supplied at about 75% resin solids in water). Both the epoxy resin and the precondensate are water soluble.

Subcoats were applied by dipping the untwisted yarn into a prepared solution and wiping off the excess with a sponge. Curing and drying was accomplished by passing the coated yarn for 16 wraps around a pair of 17 cm diameter, electrically heated rolls with their centers spaced 26 cm apart. Yarn speed in all cases was 20 ypm (18.3 mpm). Roll temperature was 150° C. for Examples 1A, C, E, G, I, and 250° C. for Examples 1B, D, F, H, J. Several different dips were prepared.

Dips for Examples 1A to 1D

Two stock solutions were prepared.

| Solution A | 22.2 g NER-010A epoxy |
| | 940 ml water |
| | 28 ml 1% NaOH |
| | 5 ml 5% Aerosol OT$^{(RTM)}$ surfactant |
| Solution B | 20.0 g Penacolite R-2170 |
| | 60 ml 1% NaOH |
| | 440 ml distilled water |

The dip for Examples 1A and 1B resulted from mixing 500 ml of Solution A with 71 ml of solution B (0.36wt % precondensate and 1.95 wt % epoxide resin). The dip for Examples 1C and 1D resulted from mixing 400 ml of Solution A, 133 ml of Solution B, and 35 ml of 1% NaOH (0.68 wt % precondensate, 1.6% epoxide resin).

Dips for Examples 1E to 1J

One stock solution was prepared.

| Solution C | 9.0 g Penacolite R-2170 |
| | 2.5 ml conc. ammonia |
| | 137 g water |

The dip for Examples 1E and 1F was prepared from 41 g of Solution C, 445 ml water, 10 g NER-010A, and 5 ml concentrated ammonia. (0.37 wt % precondensate, 2% epoxide resin).

The dip for Examples 1G and 1H was prepared from 82.5 g of Solution C, 408 ml water, 10 g NER-010A, and 5 ml concentrated ammonia (0.74 wt % precondensate, 2% epoxide resin).

The dip for Examples 1I and 1J was prepared from 5.0 g Penacolite R-2170, 102 g of water, 15 ml of 1% NaOH, 2.5 ml of 37 wt % formaldehyde, 10 g NER-010A, 350 ml water, and 40 ml of 1% NaOH (0.71% precondensate and 1.9% epoxide resin).

The coated yarns, after curing, were corded to 1500-1-2 cords at a twist multiplier of 6.5. Topcoating with RFL dip was in a Litzler oven at 475° F. (246° C.) for 1 min. under 1 lb. (4.4N) tension. Results of the 2-ply strap adhesion test were:

| | | 2-ply Strap Adhesion | | |
|---|---|---|---|---|
| | Subcoat Cure | Peel Strength | | Appearance |
| Example | Temp. (°C.) | lb. | N | Rating |
| 1A | 150 | 47 | 209 | 4 |
| 1B | 250 | — | — | — |
| 1C | 150 | 48 | 211 | 4− |
| 1D | 250 | 42 | 187 | 3.5 |
| 1E | 150 | 49 | 218 | 4 |
| 1F | 250 | 48 | 214 | 4 |
| 1G | 150 | 51 | 227 | 4+ |
| 1H | 250 | 46 | 205 | 3.5 |
| 1I | 150 | 47 | 208 | 4− |
| 1J | 250 | 51 | 227 | 4+ |

Excellent peel strengths were obtained in all cases.

EXAMPLE 2

This example illustrates adhesion activation provided by a subcoat comprising a mixture of NER-010A and a phenol formaldehyde precondensate resin. The phenol formaldehyde used was an unmodified thermosetting resin in 50 wt % solution in ethoxyethanolacetate (Arofene 85678-A1-50, Ashland Chemical Co.).

Dip solutions for Examples 2A and 2B were prepared by mixing 10 g of NER-010A, 495 ml acetone, and 5 g of 50% phenol formaldehyde (2.5 wt % epoxide resin, 0.6 wt % precondensate). For Examples 2C and 2D, 4.0 g of 50% precondensate was added to the remainder of the first dip (about 2.5 wt % epoxide resin, about 1.1 wt % precondensate).

Dipping, curing, cording, and application of RFL topcoat were as described in Example 1. Results of 2-ply strap adhesion tests were:

| | | 2-ply Strap Adhesion | | |
|---|---|---|---|---|
| | Subcoat Cure | Peel Strength | | Appearance |
| Example | Temp. (°C.) | lb. | N | Rating |
| 2A | 150 | 46 | 205 | 3.5 |
| 2B | 250 | 53 | 236 | 4 |
| 2C | 150 | 49 | 218 | 3.5 |
| 2D | 250 | 47 | 209 | 4 |

Excellent peel strengths were obtained. Indications are that subcoat cure temperatures above 150° C. slightly improve peel strengths.

EXAMPLE 3

Adhesion activation is exemplified resulting from coating yarn with a mixture of trifunctional epoxy cresol novolak glycidyl ether (Ciba Geigy ECN-1299) and hexamethoxymethylmelamine (Cymel 300).

The subcoat was applied by dipping the starting yarn into an acetone solution of the ECN-1299/melamine mixture and lightly contacting a sponge to remove excess solution. Above 160 yd (146 m) of each of 4 samples was prepared. The initial dip was made up of 4.0 g of ECN-1299, 400 ml of acetone, and 1.0 g of Cymel 300. Examples 3A and 3B used this dip. Because it was then becoming milky, another 1.0 g of Cymel 300 and enough acetone to increase the total volume to 600 ml were added. Examples 3C and 3D used this dip.

Yarn speed during dipping, drying, and curing was 20 ypm (18.3 mpm) in all cases, the dipped yarns being cured by making 16 wraps around a pair of rolls heated to either 150° C. (3A and 3C) or 250° C. (3B and 3D).

The dried yarns were twisted and plied to 1500/1/2 cords. Twisting was about 9 tpi (3.54 tpc) S and plying about 8.6 tpi (3.39 tpc) Z.

The cords were dipped into RFL and cured by passage through a Litzler oven at 245° C. for 1.0 min under 2 lb. (0.91 kg) tension. Results of the 2-ply strap adhesion test were:

|         | 2-ply Strap Adhesion | | |
|---------|------|------|------------|
|         | Peel Strength | | Appearance |
| Example | lb.  | N    | Rating     |
| 3A      | 36   | 160  | 2+         |
| 3B      | 43   | 191  | 4−         |
| 3C      | 35   | 156  | 2+         |
| 3D      | 48   | 214  | 4+         |

Examples 3B and 3D exhibit excellent peel strengths and appearance ratings. It is apparent that temperatures above 150° C. for drying the subcoat are better for this system.

I claim:

1. Adhesion activated yarn comprising aramid filaments coated with from about 1.0 to 5.0% by weight of a reaction product of an epoxide resin and an incompletely cured, thermosetting, aldehyde resin.

2. The yarn of claim 1 wherein the ratio of epoxide resin to aldehyde resin is from 1 to about 6.

3. The yarn of claim 1 wherein the aramid filaments are poly(p-phenylene terephthalamide) filaments.

4. The yarn of claim 1 having a further topcoating of resorcinol formaldehyde latex.

5. A rubber composite reinforced with the yarn of claim 4.

* * * * *